ved Dec. 7, 1965

3,222,177
LIGHT SENSITIVE MULTILAYER ELEMENT HAVING A SCRATCH-RESISTANT LAYER CONTAINING A STARCH CARBOXYLATE
José Thérèse Lemmerling, Jan de Sadelerslaan 13, Edegem, Belgium; Lodewijk Felix De Keyser, Nieuwelei 9, Mortsel-Antwerp, Belgium; Adam Marcel Schouwenaars, Zwaluwenlei 25, Edegem, Belgium; and Jules Edmond Beersmans, Zurenborgstraat 48, Antwerp, Belgium
No Drawing. Filed Oct. 3, 1962, Ser. No. 228,028
Claims priority, application Belgium, Mar. 22, 1962, 615,411
6 Claims. (Cl. 96—67)

The present invention relates to a photographic material whereby one of the surfaces of the support is provided with a light-sensitive silver halide emulsion layer and the other surface with a layer containing finely divided grains, and more especially to a method for preparing such photographic material.

A light-sensitive material the gelatin backing layer of which contains finely divided grains e.g. grains of starch in such an amount that no visible matting occurs, is described in the U.S. patent specification 2,322,037, filed April 27, 1940, by Carl G. Lindquist. Such a material has a surface roughness which increases the resistance to scratching and prevents the formation of Newton's rings on enlarging or on printing.

The grains used according to said U.S. patent specification, however, have the great disadvantage that they can only be applied from aqueous solutions. This strongly limits the possibilities of application because the layers applied on the non-light-sensitive side of a light-sensitive material frequently are coated from a mixture of solvents mainly consisting of organic solvents.

It has now been found that this disadvantage can be avoided by using grains of a hydrophobic starch derivative, which can be applied easily from a dispersion in a mixture of mainly organic solvents.

As hydrophobic starch derivatives which can be used according to the present invention may be cited among others the reaction products of urea, formaldehyde and starch preferably rice starch, starch carbamates and hydrophobic starch esters such as starch acetate and starch stearate corresponding to the formula:

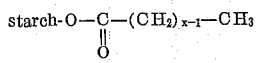

wherein $x$ represents an integer from 1 to 25.

Some preparations of hydrophobic starch derivatives used according to the present invention are given hereinafter.

PREPARATION 1

Reaction product of urea, formaldehyde and rice starch

The preparation of such reaction products is described among others by R. W. Kerr, Chemistry and Industry of Starch, 1950, pp. 74, 472 and 509.

The method of preparation described hereinafter gives a product which is particularly appropriate for preparing the photographic material according to the present invention.

1100 g. of non-dried rice starch, containing still 10% of water and having a grain size comprised between 3 and 8μ, are thoroughly stirred for 1½ hours at room temperature in a solution of 110 g. of urea in 1100 cm.³ of distilled water. Thereupon the suspension is brought in a mixture of the following composition:

Acetone _____ cm.³__ 4000
Maleic anhydride _____ g___ 10
40% aqueous formaldehyde _____ cm.³__ 340
Distilled water _____ cm.³__ 120

The mixture is stirred at room temperature until complete dissolution of the maleic anhydride. After the reaction mixture is heated for 2 h. at 40° C. with thorough stirring, it is brought at 60° C. in maximum 15 minutes. At this temperature stirring is continued for 4 h.

The formed reaction product of urea, formaldehyde and rice starch is sucked off till a moisture content of about 200% by weight of dry product and finally washed until the product is free from formaldehyde.

PREPARATION 2

Rice starch acetate

In a three-necked flask of 500 cm.³, 150 cm.³ of xylene, 100 cm.³ of acetic anhydride and 40 cm.³ of acetic acid are brought at 50° C. To this mixture are added 0.5 cm.³ of chemically pure sulphuric acid and 20 g. of rice starch, which have been dried for 2 h. at 60° C. The acetylation proceeds for 6 h. at 50° C.

The reaction mass is poured into 2 l. of ethanol whereupon the suspension thus obtained is sucked off. The rice starch acetate separated is twice washed with ethanol. Thereupon the product is stirred for further 3 h. in 100 cm.³ of a mixture consisting of 90 parts of ethanol and 10 parts of saturated aqueous sodium acetate. After sucking off, the derivative is still washed twice with ethanol and dried by an air current at 40° C. The substitution degree of acetyl groups amounts to 1, which corresponds with 21.2% of acetyl groups.

PREPARATION 3

Rice starch stearate

In a three-necked flask of 1 liter the following reagents are successively brought: 400 cm.³ of toluene, 100 cm.³ of anhydrous pyridine and 120 g. of stearoyl chloride. This mixture is heated to 50° C. whereupon 20 g. of rice starch are added which have been dried for 2 h. at 60° C. After 16 h. of reaction at 50° C. the reaction mass is poured into isopropanol. The obtained rice starch stearate is separated, washed with isopropanol and dried by an air current at 40° C. The substitution degree of stearoyl groups amounts to 1.2.

PREPARATION 4

Rice starch palmitate

A mixture of 420 cm.³ of toluene, 100 cm.³ of anhydrous pyridine and 140 g. of palmitoyl chloride are brought in a three-necked flask of 1 liter and heated at 50° C. Then 20 g. of rice starch are added which have been dried for 2 h. at 60° C. After 24 h. of reaction at 50° C., the mass is poured into isopropanol. The precipitated rice starch palmitate is washed with isopropanol and dried for 4 h. by an air current at 40° C. The substitution degree of palmitoyl groups amounts to 1.4.

Grains of hydrophobic starch derivative do not swell by absorbing humidity nor by an increase of temperature. They are completely inert and keep their grain structure and shape. The grains can especially uniformly be dispersed onto the surface to be coated. A great advantage of the use of these hydrophobic starch derivatives is that they can easily be obtained in the form of grains having almost the same size which for rice starch amounts to between 5 and 6μ. These properties are especially interesting as in consequence of their similar sizes and uniform repartition, the grains do not exert any prejudicial action during the projection of the photographic material.

According to the present invention the grains of a hydrophobic starch derivative preferably are incorporated in an antihalation layer, an anti-curling layer, an antistatic layer, a protective layer and/or a separate layer in an amount varying from 25 to 700 grains per sq. mm.

The incorporation of the grains of the hydrophobic starch derivatives according to the present invention generally occurs by dispersing the grains in the organic solutions or in the aqueous dispersions from which the aforesaid backing layers are coated and this in such an amount that after coating the above-mentioned grain distribution is attained. The application of the grains according to the present invention preferably occurs from a dispersion in organic solvents.

In a photographic material according to the present invention there is less tendency that the light-sensitive emulsion surface sticks together with the superposed backing layer as for instance after being wound for some time. The static charge is unimprotant during winding and unwinding the photographic material according to the present invention. Another important advantage obtained by the use of the photographic material according to the present invention is that the roughened back surface protects against scratching, which eventually destroys the local action of the antihalation layer completely and which exerts an injurious action on printing and on projection. Finally the material according to the present invention prevents formation of Newton's rings on printing or on enlarging.

Some examples concerning the use of hydrophobic starch derivatives according to the present invention are given hereinafter. Testing of the resistance to scratching occurs as follows:

A film strip of 35 mm. is passed with its back surface over a polished roller at a well-defined constant speed and with a determined pressure.

The scratches are then tested with the naked eye in sloping incident light:

0 means no scratching
1 means a little scratching
2 means a degree of scratching which is not hindering for photographic purposes
3 means a degree of scratching which is hindering for photographic purposes
4 means such a degree of scratching that the photographic material is not usuable at all.

The following examples illustrate the invention.

EXAMPLE 1

0.250 g. of cellulose triacetate is disolved in a mixture of the following composition:

|  | Cm.³ |
|---|---|
| Methylene chloride | 10 |
| 1,2-dichloroethane | 40 |
| Acetone | 30 |
| Ethanol | 12.5 |
| n-Butanol | 6.5 |
| Dibutyl phthalate | 1 |

To 6 of such solutions is added whilst stirring such an amount of a 40% suspension in water or methylethyl ketone of the compound obtained according to Preparation 1 that compositions are obtained as listed in Table 1.

The coating solutions for backing layers thus obtained are applied on a cellulose triacetate support as to cover 40 sq. m. with 1 liter. After drying the resistance to scratching of the film strips is tested. The results are given in Table 1.

TABLE 1

| Products according to preparation 1, percent by weight— | | Degree of scratching— | |
|---|---|---|---|
| Of coating solution | In respect of the solid substance | Before photographic | After processing |
| 0.000 | 0 | 2 | 3 |
| 0.005 | 2 | 1 | 2 |
| 0.010 | 4 | 0 | 1 |
| 0.020 | 8 | 0 | 0 |
| 0.050 | 20 | 0 | 0 |
| 0.100 | 40 | 0 | 0 |
| 0.250 | 100 | 0 | 0 |

Moreover, after some time of being wound, the materials having a backing layer containing hydrophobic grains as described above show no or little staining caused by the intimate contact of the emulsion side with the rear side, nor any adhesion of the two sides to each other. Likewise, only a small static charge is stated on winding and unwinding these materials.

EXAMPLE 2

0.750 g. of cellulose acetate (substitution degree of acetyl: 2.7) is dissolved in a mixture of the following composition:

|  | Cm.³ |
|---|---|
| Acetone | 85 |
| Ethanol | 7.5 |
| n-Butanol | 7.5 |

To 5 of such solutions is added whilst stirring such an amount of a 40% suspension of rice starch acetate (substitution degree of acetyl: 0.6) in methylethylketone, that the compositions given in table 2 are obtained. The coating solutions for backing layers thus obtained are applied on a cellulose triacetate support in the ratio of 30 sq. m. per liter. After drying, the resistance to scratching of the film strips is tested. The results are given in Table 2.

TABLE 2

| Rice starch acetate percent by weight— | | Degree of scratching— | |
|---|---|---|---|
| Of coating solution | In respect of the solid substance | Before photographic | After processing |
| 0.00 | 0.0 | 1 | 2 |
| 0.02 | 2.6 | 0 | 1 |
| 0.03 | 4.0 | 0 | 0 |
| 0.05 | 6.6 | 0 | 0 |
| 0.06 | 8.0 | 0 | 0 |
| 0.10 | 13.3 | 0 | 0 |

EXAMPLE 3

To several coating solutions for backing layers as described in Example 1 (containing no products according to the present invention) is added a suspension in methylethylketone of one of the starch derivatives mentioned in Table 3, in such an amount that 8% by weight of these starch derivatives in respect of the cellulose triacetate is present. These coating compositions are applied as backing layers on a cellulose triacetate support. After drying the resistance to scratching of these film strips is tested.

The results are given in Table 3.

TABLE 3

| Product added | Degree of scratching— | |
| --- | --- | --- |
| | Before photographic | After processing |
| Product according to Preparation 1 | 3 | 3 |
| Rice starch acetate: | 0 | 0 |
| (degree of substitution: 0.6) | 1 | 1 |
| (degree of substitution: 1.3) | 0 | 0 |
| (degree of substitution: 2.0) | 1 | 1 |
| (degree of substitution: 2.9) | 1 | 1 |
| Rice starch stearate: | | |
| (degree of substitution: 1.3) | 2 | 1 |

EXAMPLE 4

0.250 g. of cellulose acetosulphate (substitution degree of acetyl: 1.8; substitution degree of sulphate: 0.7) are dissolved in a mixture of the following composition:

| | Cm.³ |
| --- | --- |
| Water | 20 |
| Ethanol | 25 |
| Acetone | 55 |

To 4 of such solutions is added each time one of the hydrophobic starch derivatives mentioned in Table 4, in such an amount that 50% by weight of these starch derivatives in respect of the cellulose acetosulphate is present. Each mixture is then applied as an antistatic layer on a support provided with a backing layer as described for the first film strip of Example 1 containing no product according to the present invention. The mixture is coated in such a way that 35 sq. m. are covered with 1 liter. After drying the resistance to scratching of these film strips is tested.

The results are given in Table 4.

TABLE 4

| Product added: | Degree of scratching |
| --- | --- |
| None | 3 |
| Product according to Preparation 1 | 0 |
| Rice starch acetate— | |
| (Degree of substitution: 0.6) | 0 |
| (Degree of substitution: 1.5) | 1 |
| (Degree of substitution: 2.9) | 2 |

EXAMPLE 5

On the back side of a support which is provided with a backing layer as described in Example 1 containing no products according to the present invention, is coated a layer from a suspension of the following composition:

| | |
| --- | --- |
| Carbon black _____g__ | 12 |
| Cellulose acetophthalate _____g__ | 30 |
| (Substitution degree of acetyl groups: 2.2) | |
| (Substitution degree of phthalyl groups: 0.4) | |
| Methanol _____cm.³__ | 550 |
| Acetone _____cm.³__ | 450 |
| 40% suspension of the product according to Preparation 1 in methylethylketone _____cm.³__ | 5 |

On the front surface of this material a usual silver halide emulsion layer is applied.

The backing layer of this light-sensitive material shows a much better resistance to scratching than the material containing no product according to the present invention.

EXAMPLE 6

On a cellulose triacetate support is coated a cellulose acetate backing layer as described in Example 2. On this backing layer an antihalation layer is coated from the following suspension:

| | |
| --- | --- |
| Cellulose nitrate (nitrogen content: 11.5%) ____g__ | 5 |
| Ethylecellulose (substitution degree of ethyl 2.45) _____g__ | 10 |
| Butanol _____cm.³__ | 200 |
| Methanol _____cm.³__ | 800 |

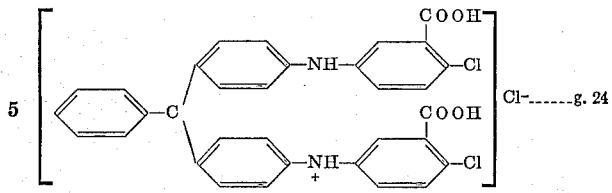

| | |
| --- | --- |
| 40% suspension of starch acetate (degree of substitution: 0.6) in methylethylketone _____cm.³__ | 2.8 |

This antihalation layer is coated in such a way that 37.2 sq. m. are covered with one liter. On testing the resistance to scratching of such a material and of a same material containing no starch acetate the former obtains value 1 whereas the latter obtains value 3.

We claim:

1. A photographic material comprising a support, which on the one side is provided with at least one silver halide emulsion layer and on the other side with at least one layer containing finely divided grains consisting of a hydrophobic starch ester of the formula

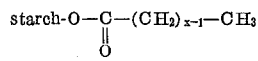

wherein $x$ is an integer from 1 to 25.

2. A process for the preparation of a photographic material comprising coating onto one side of a support at least one silver halide emulsion layer and coating onto the other side of said support a layer containing finely divided grains consisting of a hydrophobic starch ester of the formula

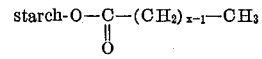

wherein $x$ is an integer from 1 to 25, coated from a coating composition comprising a dispersion of said ester in a solution of a binding agent in an organic solvent.

3. A photographic material comprising a support which on the one side is provided with at least one silver halide emulsion and on the other side with at least one layer containing finely divided grains consisting of a hydrophobic starch ester of the formula

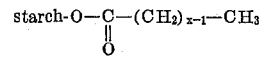

wherein "$x$" is an integer from 1 to 25, applied to said support from a coating composition comprising a dispersion of said ester in a solution of a binding agent in an organic solvent.

4. The material of claim 1 further characterized in that the number of grains varies between 25 and 700 per square mm.

5. The process of claim 2, further characterized in that the number of grains applied varies between 25 and 700 per square mm.

6. A photographic material comprising a support which on the one side is provided with at least one silver halide emulsion and the other side with at least one layer containing finely divided grains consisting of the reaction product of urea, formaldehyde, and rice starch applied to said support from a coating composition comprising a dispersion of said reaction product in a solution of a binding agent in an organic solvent.

References Cited by the Examiner

UNITED STATES PATENTS 2,322,037   6/1943   Lindquist _____ 96—94

FOREIGN PATENTS 598,861   6/1961   Belgium.
1,128,288   4/1962   Germany.

NORMAN G. TORCHIN, *Primary Examiner.*